(12) United States Patent  
Takagi

(10) Patent No.: US 8,876,645 B2
(45) Date of Patent: Nov. 4, 2014

(54) OIL-PRESSURE CONTROL DEVICE AND MANUFACTURING METHOD THEREOF

(71) Applicant: Denso Corporation, Kariya (JP)

(72) Inventor: Akira Takagi, Obu (JP)

(73) Assignee: Denso Corporation, Kariya (JP)

( * ) Notice: Subject to any disclaimer, the term of this patent is extended or adjusted under 35 U.S.C. 154(b) by 109 days.

(21) Appl. No.: 13/780,545

(22) Filed: Feb. 28, 2013

(65) Prior Publication Data

US 2013/0228229 A1    Sep. 5, 2013

(30) Foreign Application Priority Data

Mar. 2, 2012   (JP) .................................. 2012-46523

(51) Int. Cl.
*F16H 59/08* (2006.01)
*F16K 31/12* (2006.01)

(52) U.S. Cl.
CPC ................ *F16K 31/12* (2013.01); *F16H 59/08* (2013.01)
USPC ........................................ 475/131; 192/3.62

(58) Field of Classification Search
USPC .............. 475/131; 192/3.57, 3.62; 137/15.18, 137/625.33, 625.34
See application file for complete search history.

(56) References Cited

U.S. PATENT DOCUMENTS

2006/0093169 A1   5/2006   Takahashi et al.
2009/0137143 A1   5/2009   Takanashi et al.

FOREIGN PATENT DOCUMENTS

JP   2005-291371   10/2005

*Primary Examiner* — Richard Ridley
(74) *Attorney, Agent, or Firm* — Nixon & Vanderhye PC

(57) ABSTRACT

A coupling plate of a detent lever is assembled to an oil-pressure control device, wherein a transmission casing is a base for an assembling process. A slider of a range sensor coupled to the coupling plate is assembled to the transmission casing via a sensor body. A spool of a manual valve coupled to the coupling plate is assembled to the transmission casing via a valve body fixed to the sensor body. The coupling plate, the slider and the spool are assembled together, wherein the transmission casing is used as the base for the assembling process. It is not necessary to relatively position the slider and the spool to each other during the assembling process for an oil-pressure control device.

7 Claims, 8 Drawing Sheets

OIL-PRESSURE CONTROL DEVICE AND MANUFACTURING METHOD THEREOF

CROSS REFERENCE TO RELATED APPLICATION

This application is based on Japanese Patent Application No. 2012-046523 filed on Mar. 2, 2012, the disclosure of which is incorporated herein by reference.

FIELD OF TECHNOLOGY

The present disclosure relates to an oil-pressure control device applied to an automatic transmission apparatus for changing a shift range of a vehicle and relates to a method for manufacturing the oil-pressure control device.

BACKGROUND

An oil-pressure control device for an automatic transmission apparatus is known in the art, according to which pressure of working oil to be supplied to clutches of the automatic transmission apparatus is controlled to thereby control engagement and disengagement of the clutches in order to change a shift range of the automatic transmission apparatus. In such oil-pressure control device, a detent lever is rotated or reciprocated in accordance with a shift range selected by a vehicle driver. A manual valve, to which the rotational or reciprocal movement of the detent lever is inputted, has a spool for changing an oil passage by its reciprocal movement. A linear solenoid valve, to which the working oil is supplied by the change of the oil passage, supplies the working oil to the clutches after the pressure of the working oil is adjusted. According to the above operation, gears corresponding to the clutches are connected to each other, to thereby change the shift range of the automatic transmission apparatus.

The oil-pressure control device has a range sensor, which converts a relative position of the spool to a valve body of the manual valve into an electrical signal so as to output the electrical signal corresponding to the relative position of the spool to an electronic control unit of the automatic transmission apparatus. Two recessed portions are formed at a coupling portion formed at one end of the spool. A slider pin formed in a slider is coupled with one of the recessed portions, while a lever pin formed in the detent lever is coupled with the other recessed portion. According to the above structure, the spool of the manual valve as well as the slider of the range sensor is moved in accordance with the movement of the detent lever, which is connected to a shift lever operated by the vehicle driver.

A dimension of the recessed portion (for the slider pin) is made to be larger than a diameter of the slider pin, so that slider can smoothly move. In the similar manner, a dimension of the other recessed portion (for the lever pin) is made to be larger than a diameter of the liver pin, so that the spool can smoothly move in the valve body. According to such structure, an error inevitably exists between an actual relative position of the spool to the valve body and a relative position of the spool detected by the range sensor.

An inhibitor switch for the automatic transmission apparatus is known in the art, for example, as disclosed in Japanese Patent Publication No. 2005-291371, according to which two pins are formed in the detent lever. Each of the slider and the spool has a recessed portion, with which the respective pin is coupled. According to such a structure, the error between the actual relative position of the spool to the valve body and the relative position of the spool detected by the range sensor is made smaller.

According to the structure of the above inhibitor switch for the automatic transmission apparatus, the slider and the spool are respectively assembled to the valve body of the manual valve. On the other hand, the detent lever is assembled to a transmission casing for accommodating the automatic transmission apparatus. Since not only the spool as well as the slider is movable with respect to the valve body but also the detent lever is movable with respect to the transmission casing, it is necessary to use a specific jig for fixing relative positions of the spool and the slider to the detent lever when the spool and the slider are assembled together to the detent lever at the same time. Accordingly, not only the specific jig is necessary but also an assembling process becomes complicated, to thereby increase a number of assembling steps for the oil-pressure control device.

SUMMARY OF THE DISCLOSURE

The present disclosure is made in view of the above problem. It is an object of the present disclosure to provide an oil-pressure control device for an automatic transmission apparatus, according to which an error between an actual position of a spool and a detected position of the spool is made smaller and a number of assembling steps can be reduced.

According to a feature of the present disclosure, an oil-pressure control device of an automatic transmission apparatus is composed of;

a coupling unit, which is rotated or reciprocated in accordance with a shift range selected by a range selecting unit;

a position detecting unit, which has a slider moving in tandem with the coupling unit and a sensor body for movably accommodating the slider, so that the slider moves in a reciprocating manner; and an oil-passage changing unit, which has a spool moving in tandem with the coupling unit and a valve body for movably accommodating the spool, so that the spool moves in a reciprocating manner in the valve body.

In the oil-pressure control device, the sensor body is positioned by a first positioning unit to a housing on one hand, and the sensor body is positioned by a second positioning unit to the valve body.

The coupling unit is assembled to the housing, wherein the housing is used as a base for an assembling process. The slider, which moves in tandem with the coupling unit, is assembled by the first positioning unit to the housing via the sensor body. The spool, which moves in tandem with the coupling unit, is assembled by the second positioning unit to the housing via the valve body which is assembled to the sensor body. According to the above features, it is possible to sequentially assemble the slider and the spool to the coupling unit, wherein the housing is used as the base for the assembling processes. It is, therefore, not necessary to position the slider and the spool relative to the coupling unit.

As above, it is possible to reduce a number of assembling steps without increasing the error between the actual relative position of the spool to the valve body and the detected relative position of the spool detected by the positioning detecting unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
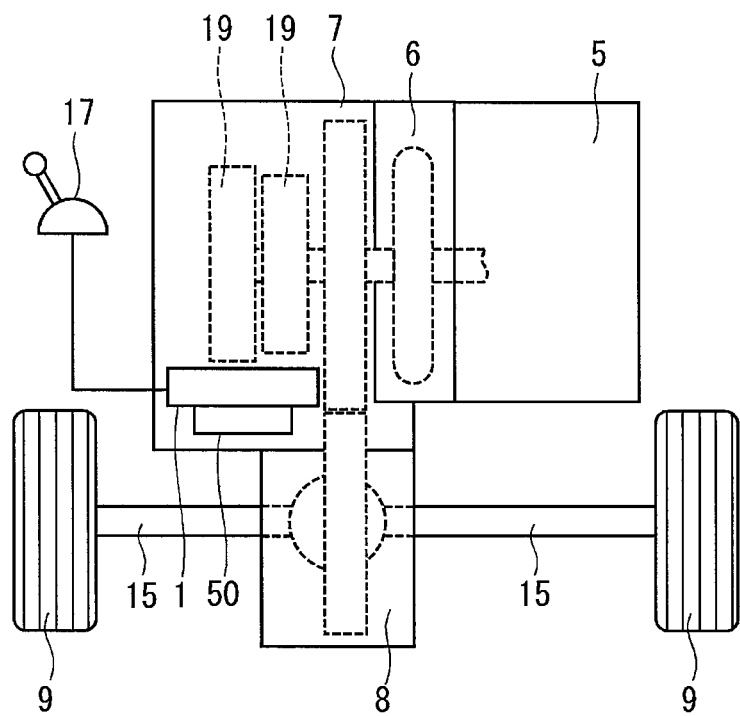
FIG. 1 is a schematic view showing a driving system of a vehicle, to which an oil-pressure control device for an automatic transmission apparatus according to a first embodiment of the present disclosure is applied.

An oil-pressure control device for an automatic transmission apparatus according to the present disclosure will be explained hereinafter by way of multiple embodiments. The same reference numerals are given to the same or similar portions and/or structures throughout the embodiments, for the purpose of eliminating repeated explanation.

First Embodiment

FIG. 1 schematically shows a driving system of a vehicle, to which an oil-pressure control device 1 for an automatic transmission apparatus according to a first embodiment of the present disclosure is applied. The vehicle shown in FIG. 1 is a front-engine and front-drive type (FF type) vehicle. The vehicle driving system is composed of an internal combustion engine 5 (hereinafter, the engine 5), a torque converter 6, an automatic transmission apparatus 7, a differential gear 8, a drive shaft 15, front wheels 9, a shift lever 17, and so on.

The automatic transmission apparatus 7 is connected to the engine 5 via the torque converter 6. The automatic transmission apparatus 7 is composed of the oil-pressure control device 1, a linear solenoid valve 50, multiple gears 19, clutches (not shown) and so on. A shift range, which is selected by an operation of the shift lever 17 by a vehicle driver, is inputted to the oil-pressure control device 1. The oil-pressure control device 1 and the linear solenoid valve 50 supply working oil, oil pressure of which is adjusted depending on the shift range inputted to the oil-pressure control device 1, to the clutches. The clutches are engaged or disengaged by the working oil supplied thereto, to thereby change the gears 19.

The automatic transmission apparatus 7 adjusts rotational torque and rotational speed outputted from the engine 5 via the torque converter 6. The adjusted rotational torque and rotational speed are outputted to the front wheels 9 via the differential gear 8 (connected to the automatic transmission apparatus 7) and the drive shaft 15, so that the vehicle runs at a desired speed.

Figure 2:
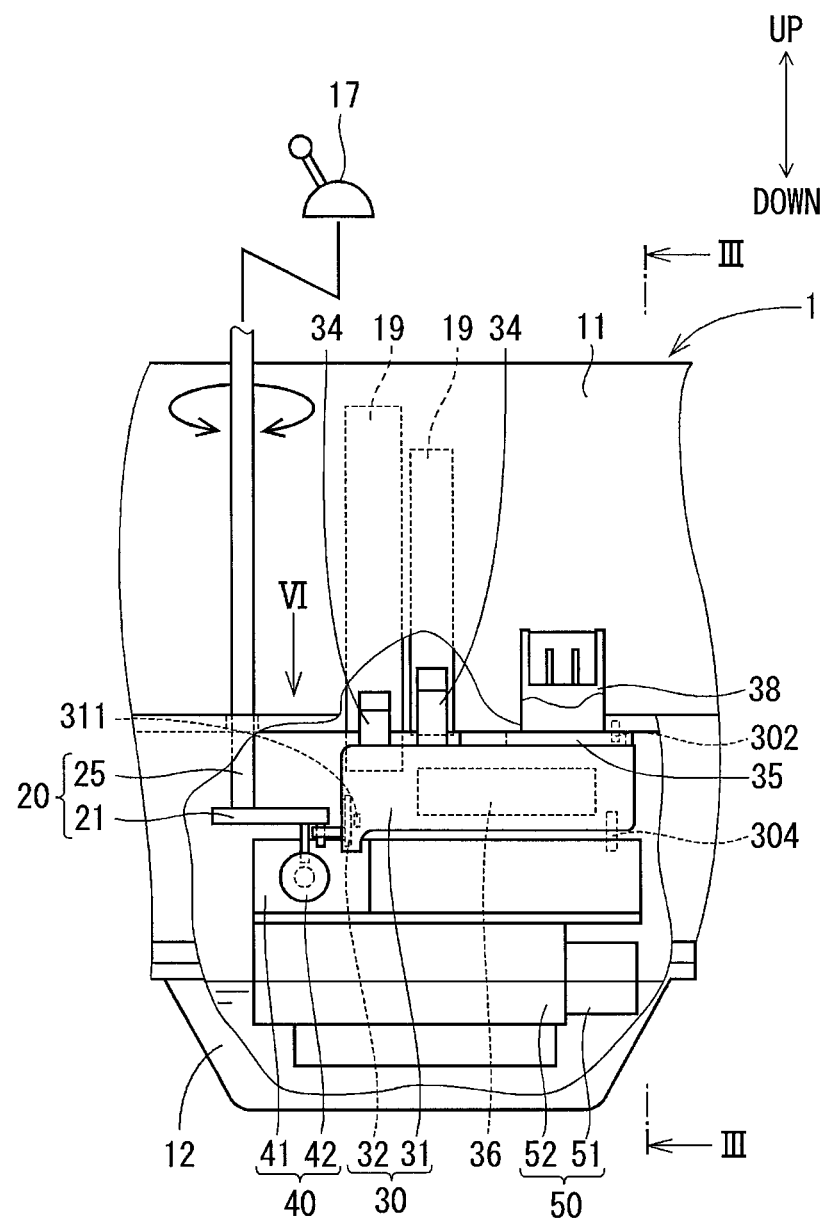
FIG. 2 is a schematic partial cross sectional view of the oil-pressure control device for the automatic transmission apparatus of the first embodiment.
Figure 3:
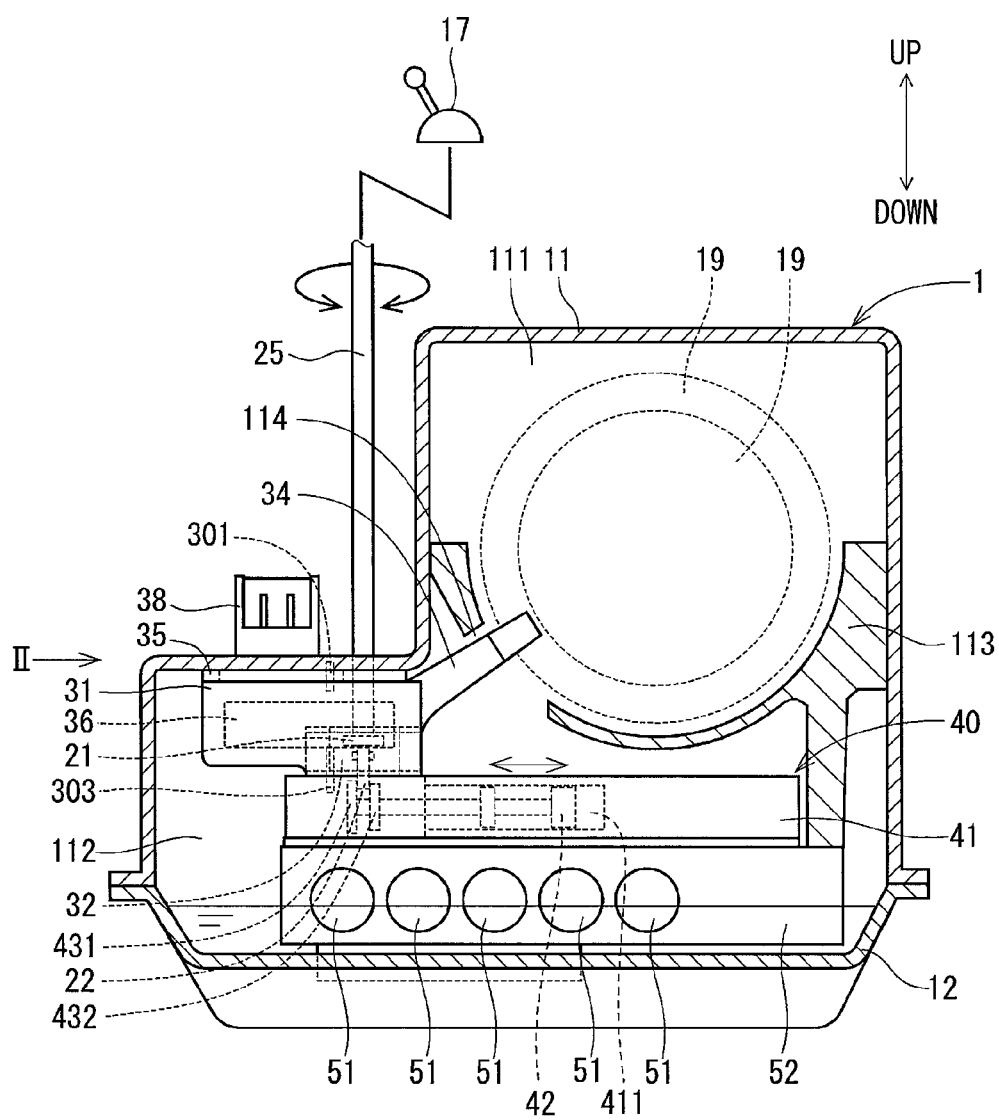
FIG. 3 is a schematic cross sectional view taken along a line III-III in FIG. 2.

A structure of the oil-pressure control device 1 will be explained with reference to FIGS. 2 to 5. FIG. 2 shows a partial cross sectional view of the oil-pressure control device 1, when viewed in a direction indicated by an arrow II in FIG. 3. In FIGS. 2 and 3, an arrow (up-down) shows a vertical direction.

The oil-pressure control device 1 is composed of a transmission casing 11, an oil pan 12, a detent lever 20, a range sensor 30, a manual valve 40 and so on.

The transmission casing 11 is made of metal, for example, aluminum, and formed in a box shape having a bottom. A partitioning wall 113 is formed in the transmission casing 11 so as to define a gear accommodating chamber 111 for accommodating the gears 19 and a valve accommodating chamber 112 for accommodating the manual valve 40, the linear solenoid valve 50 and so on. The partitioning wall 113 is integrally formed with the transmission casing 11 and prevents a large amount of the working oil pooled in the valve accommodating chamber 112 from entering the gear accommodating chamber 111. A communication hole 114 is formed in the partitioning wall 113 for communicating the gear accommodating chamber 111 and the valve accommodating chamber 112 to each other.

The oil pan 12 is made of metal, for example, iron, and formed in a box shape having a bottom. A depth of the bottom is smaller than that of the transmission casing 11. The oil pan 12 is fixed to the transmission casing 11 by bolts (not shown) or the like. The oil pan 12 closes an open portion of the transmission casing 11, to thereby form the valve accommodating chamber 112 together with the transmission casing 11. The oil pan 12 pools the working oil, which is used for the automatic transmission apparatus 7. The transmission casing 11 and the oil pan 12 are collectively referred to as a housing.

The detent lever 20 is composed of a lever 25, a coupling plate 21 and so on. The detent lever 20 is also referred to as a coupling unit.

One end of the lever 25 is connected to the shift lever 17 (which is also referred to as a range selecting unit). The other end of the lever 25 is projected into the valve accommodating chamber 112 through an opening formed in the transmission casing 11 and connected to the coupling plate 21 at a right angle. The lever 25 is rotated depending on the shift range selected by the shift lever 17. A detent plate (not shown) is in contact with the lever 25, in order that the rotational position of the lever 25 is maintained at one of multiple preset positions.

Figure 5:
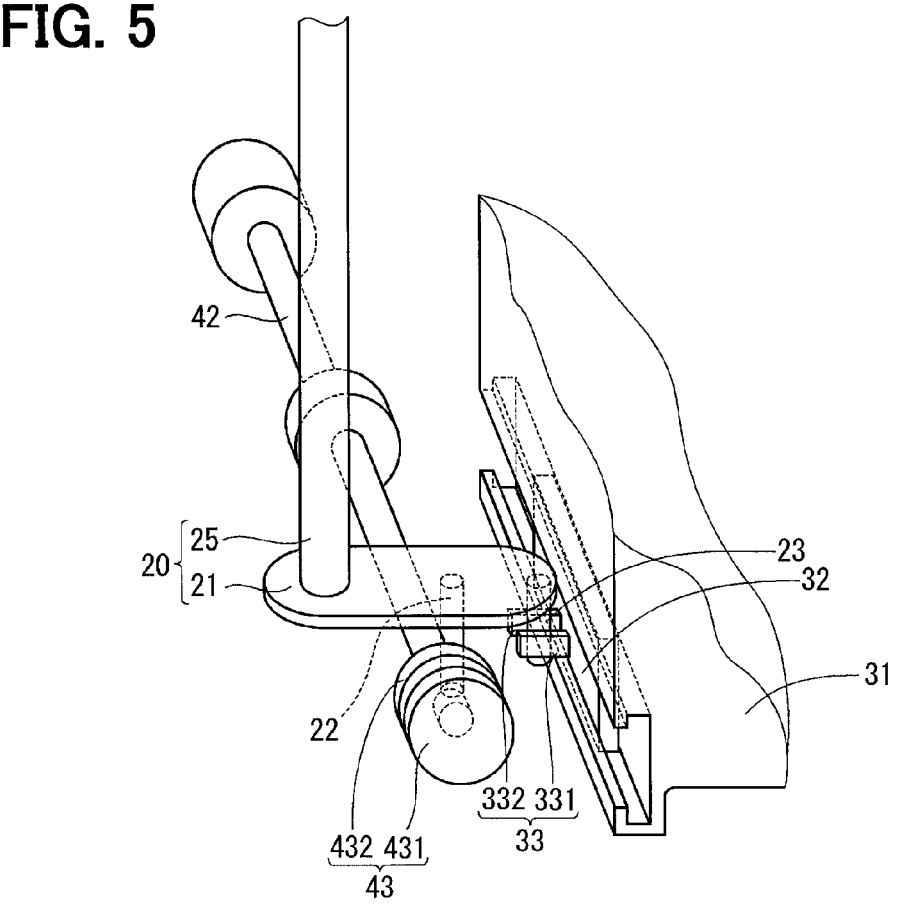
FIG. 5 is a schematic perspective view showing relevant portions of the oil-pressure control device, including a lever, a slider and a spool.

The coupling plate 21 is made of a flat plate. As shown in FIG. 5, a pair of coupling pins 22 and 23 is formed in the coupling plate 21 at a surface opposite to a surface connected to the lever 25. FIG. 5 is an enlarged perspective view showing portions of the lever 25, a spool 42 of the manual valve 40 and a slider 32 of the range sensor 30, which are coupled together. The coupling pin 22 (for the spool 42) formed in the coupling plate 21 is coupled with a coupling portion 43 formed at one end of the spool 42. The coupling pin 22 is also referred to as a first coupling pin. The coupling pin 23 (for the slider 32) formed in the coupling plate 21 is coupled with a coupling portion 33 of the slider 32. The coupling pin 23 is also referred to as a second coupling pin. Coupling conditions between the detent lever 20 and the spool 42 and between the detent lever 20 and the slider 32 will be explained more in detail below.

The range sensor 30 is composed of a sensor body 31 having a magnetic detecting element 311, the slider 32 and so on. The range sensor 30 is also referred to as a position detecting unit.

The sensor body 31 is formed in a box shape and provided in the valve accommodating chamber 112 on a side to the transmission casing 11. The sensor body 31 is fixed to an inner wall of the transmission casing 11 by a pair of first positioning pins 301 and 302. The first positioning pins 301 and 302 are separated from each other, so that the sensor body 31 is prevented from being rotated with respect to the transmission casing 11. The slider 32 is movably attached to a side wall of the sensor body 31, so that the slider 32 is movable in a horizontal direction. The magnetic detecting element 311 is provided in the sensor body 31 at a position adjacent to the side wall thereof. The first positioning pins 301 and 302 are also collectively referred to as a first positioning unit.

Figure 4:
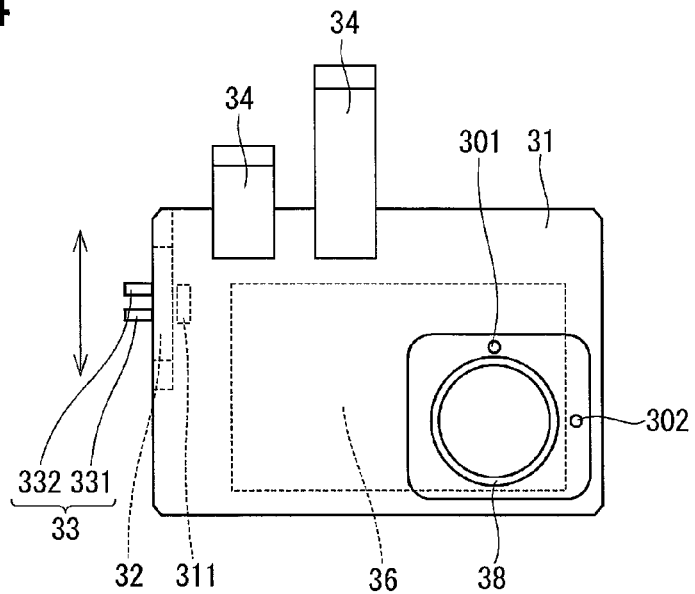
FIG. 4 is a schematic top plan view showing a sensor body of the oil-pressure control device.

The slider 32 is made of a flat plate member. As shown in FIG. 4, the slider 32 is provided at the side wall of the sensor body 31, so that the slider 32 slides on the side wall. The coupling portion 33, which is composed of a first projection 331 and a second projection 332, is formed on a surface of the slider 32, which is opposite to a sliding surface of the slider 32 being in a sliding contact with the sensor body 31. The second coupling pin 23 (for the slider 32) is coupled with the coupling portion 33 of the slider 32, so that the slider 32 moves back and forth along the side wall of the sensor body 31 in accordance with the rotational movement of the detent lever 20. A distance between the first and second projections 331 and 332 is larger than an outer diameter of the second coupling pin 23 (for the slider 32), so that the slider 32 smoothly moves back and forth. In FIG. 4, an arrow shows a direction for a reciprocal movement of the slider 32.

A magnet (not shown) is provided in the sliding surface of the slider 32, which is in the sliding contact with the sensor body 31. The magnetic detecting element 311 provided in the sensor body 31 detects magnetic field changing in accordance with the movement of the slider 32, that is, depending on a position of the magnet provided in the slider 32, to thereby detect the position of the slider 32 with respect to the sensor body 31. As above, the range sensor 30 is a contactless type position detecting unit.

The sensor body 31 has rotation sensors 34, an electronic control unit 36 (hereinafter, the ECU 36), a connector 38 and a heat radiating plate 35.

Each of the rotation sensors 34 is provided in the sensor body 31 in such a way that the rotation sensor 34 is projected into the gear accommodating chamber 111 through the communication hole 114. Each of the rotation sensors 34 detects rotational speed of each gear 19 (which is also referred to as a rotating member 19) and outputs detected rotational speed to the ECU 36. The rotation sensors 34 are also collectively referred to as a rotational speed detecting unit.

The ECU 36 is composed of, for example, a well-known micro-computer. The following detection signals are inputted to the ECU 36;
- a signal, which is detected by the slider 32 (the magnetic detecting element 311 provided in the sensor body 31), for a relative position of the spool 42 to a valve body 41;
- signals for the rotational speed of the gears 19, which are respectively detected by each of the rotation sensors 34;
- signals including information of the automatic transmission apparatus 1, including signals from an oil-pressure sensor, an oil-pressure switch, an oil-temperature sensor and so on (which are not shown in the drawing); and
- signals including engine information, for example, engine torque, and so on.

The ECU 36 selects a shift range, which is appropriate for running the vehicle, based on the above multiple input signals. The ECU 36 transmits a command signal to the linear solenoid valve 50 for changing the shift range.

The connector 38 is provided in the sensor body 31 in such a way that the connector 38 is projected to an outside of the transmission casing 11 through an opening formed at an outer wall of the transmission casing 11. The connector 38 is electrically connected to a transmission control unit (not shown) and a power supply source (not shown) of the vehicle, both of which are located at the outside of the transmission casing 11. The connector 38 not only receives signals outputted from the transmission control unit and electric power from the power supply source, but also transmits signals (including information for the shift range decided by the ECU 36) to outside electronic devices.

The heat radiating plate 35 is an almost flat plate member, which is provided between the sensor body 31 and an inner wall of the transmission casing 11. The heat radiating plate 35 transmits heat generated at the sensor body 31 to the transmission casing 11.

The manual valve 40 has the valve body 41 formed at an almost center of the valve accommodating chamber 112 and the spool 42 movably inserted into a spool bore 411 formed in the valve body 41. The spool 42 reciprocates in the spool bore 411. The manual valve 40 is also referred to as an oil-passage changing unit.

The valve body 41 is formed in a cuboid shape and fixed to a lower side of the sensor body 31 by a pair of second positioning pins 303 and 304. Although not shown in the drawings, an inlet oil-port, a discharge oil-port for a forward movement and a discharge oil-port for a backward movement are formed in the spool bore 411 of the valve body 41. The discharge oil-ports for the forward movement and the backward movement are respectively communicated to oil-pressure adjusting portions 51 of the linear solenoid valve 50. The second positioning pins 303 and 304 are also collectively referred to as a second positioning unit.

As shown in FIG. 3, two lands are formed at one axial end of the spool 42 (at a right-hand end in FIG. 3), which is movably inserted into the spool bore 411. A first and a second lands 431 and 432, which form the coupling portion 43, are formed at the other axial end of the spool 42 (at a left-hand end in FIG. 3), which is on an opposite side to the right-hand end inserted into the spool bore 411. The first coupling pin 22 of the coupling plate 21 is coupled with the coupling portion 43. A distance between the first and second lands 431 and 432 is larger than an outer diameter of the first coupling pin 22 (for the spool 42), so that the spool 42 smoothly moves back and forth in the spool bore 411. In FIG. 3, an arrow shows a direction for a reciprocal movement of the spool 42.

The first coupling pin 22 (for the spool 42) is coupled with the coupling portion 43 of the spool 42, so that the spool 42 moves back and forth in the spool bore 411 in accordance with the rotational movement of the detent lever 20. When the spool 42 is moved, the manual valve 40 changes communication condition of the inlet oil-port depending on positions of the two lands formed at the end of the spool 42 (at the right-hand end in FIG. 3), namely changes to one of the following conditions;
  (i) a communication between the inlet oil-port and the discharge oil-port for the forward movement;
  (ii) a communication between the inlet oil-port and the discharge oil-port for the backward movement; and
  (iii) a non-communication between the inlet oil-port and the discharge oil-port for the forward and backward movement.

The linear solenoid valve 50 has the oil-pressure adjusting portions 51 and a supporting portion 52, which is connected to a lower side of the valve body 41. Each of the oil-pressure adjusting portions 51 is composed of an electromagnetic valve and multiple electromagnetic valves are respectively provided at the inlet oil-port and the discharge oil-port. The linear solenoid valve 50 adjusts pressure of the working oil by the multiple oil-pressure adjusting portions 51 and supplies such working oil (the pressure of which is adjusted) to corresponding clutch portions.

An assembling process for the automatic transmission apparatus 7 having the oil-pressure control device 1 will be explained with reference to FIGS. 1 to 3.

At first, the transmission casing 11 and the detent lever 20 are assembled to each other. One end of the lever 25 (a lower end thereof) is inserted into the transmission casing 11 through the opening formed at the outer wall of the transmission casing 11. The coupling plate 21 is fixed to the lower end of the lever 25. The shift lever 17 is connected to the other end of the lever 25 (an upper end thereof).

Then, the sensor body 31 and the transmission casing 11 are assembled to each other. The assembling process for the sensor body 31 and the transmission casing 11 is also referred to as a first step. The slider 32 is movably attached to the sensor body 31. More in detail, the sensor body 31 is fixed to the inner wall of the transmission casing 11, while the sensor body 31 is positioned to the transmission casing 11 by the first positioning pins 301 and 302. In the assembling process of the first step, the second coupling pin 23 is coupled with the coupling portion 33 of the slider 32, so that the slider 32 moves back and forth along the side wall of the sensor body 31 in accordance with the rotational movement of the detent lever 20.

Then, the valve body 41, in which the spool 42 is movably inserted into the spool bore 411, and the sensor body 31 fixed to the inner wall of the transmission casing 11 are assembled to each other. The assembling process for the valve body 41 and the sensor body 31 is also referred to as a second step. The valve body 41 is positioned to the sensor body 31 by the second positioning pins 303 and 304. In the assembling process of the second step, the first coupling pin 22 is coupled with the coupling portion 43 of the spool 42, so that the spool 42 moves back and forth in the spool bore 411 in accordance with the rotational movement of the detent lever 20.

Then, the supporting portion 52, in which the oil-pressure adjusting portions 51 are assembled, is connected to the valve body 41. The supporting portion 52 is fixed to a lower side of the valve body 41 by bolts (not shown) or the like.

Then, the oil pan 12 is assembled to the transmission casing 11 to form the valve accommodating chamber 112. The working oil is poured in the valve accommodating chamber 112. The multiple gears 19 and clutch portions (not shown) are assembled to the oil-pressure control device 1, in which the linear solenoid valve 50 is assembled. The automatic transmission apparatus 7 is thus completed.

An operation of the automatic transmission apparatus 7 having the oil-pressure control device 1 will be explained with reference to FIGS. 2, 3 and 5 to 7.

When the vehicle driver selects one of shift ranges, among a parking range, a rear-drive range, a neutral range and a drive range, the lever 25 is rotated in accordance with the selected shift range. When the lever 25 is rotated, the coupling plate 21 is rotated around the lever 25. The spool 42, which is connected to the coupling plate 21 via the first coupling pin 22 and the coupling portion 43, reciprocates in the spool bore 411 in tandem with the coupling plate 21. The working oil in the manual valve 40 is supplied to the linear solenoid valve 50 depending on the movement of the spool 42.

The slider 32, which is connected to the coupling plate 21 via the second coupling pin 23 and the coupling portion 33, reciprocates along the side wall of the sensor body 31 in tandem with the coupling plate 21. The magnetic detecting element 311 detects the position of the slider 32 relative to the magnetic detecting element 311 and outputs the detection signal to the ECU 36. The ECU 36 controls the operation of the linear solenoid valve 50 depending on the relative position of the spool 42 with respect to the valve body 41 (which is calculated from the relative position of the slider 32), the rotational speed of the gears 19 and so on. As a result, the shift range of the vehicle is controlled to the shift range selected by the vehicle driver.

Figure 6:
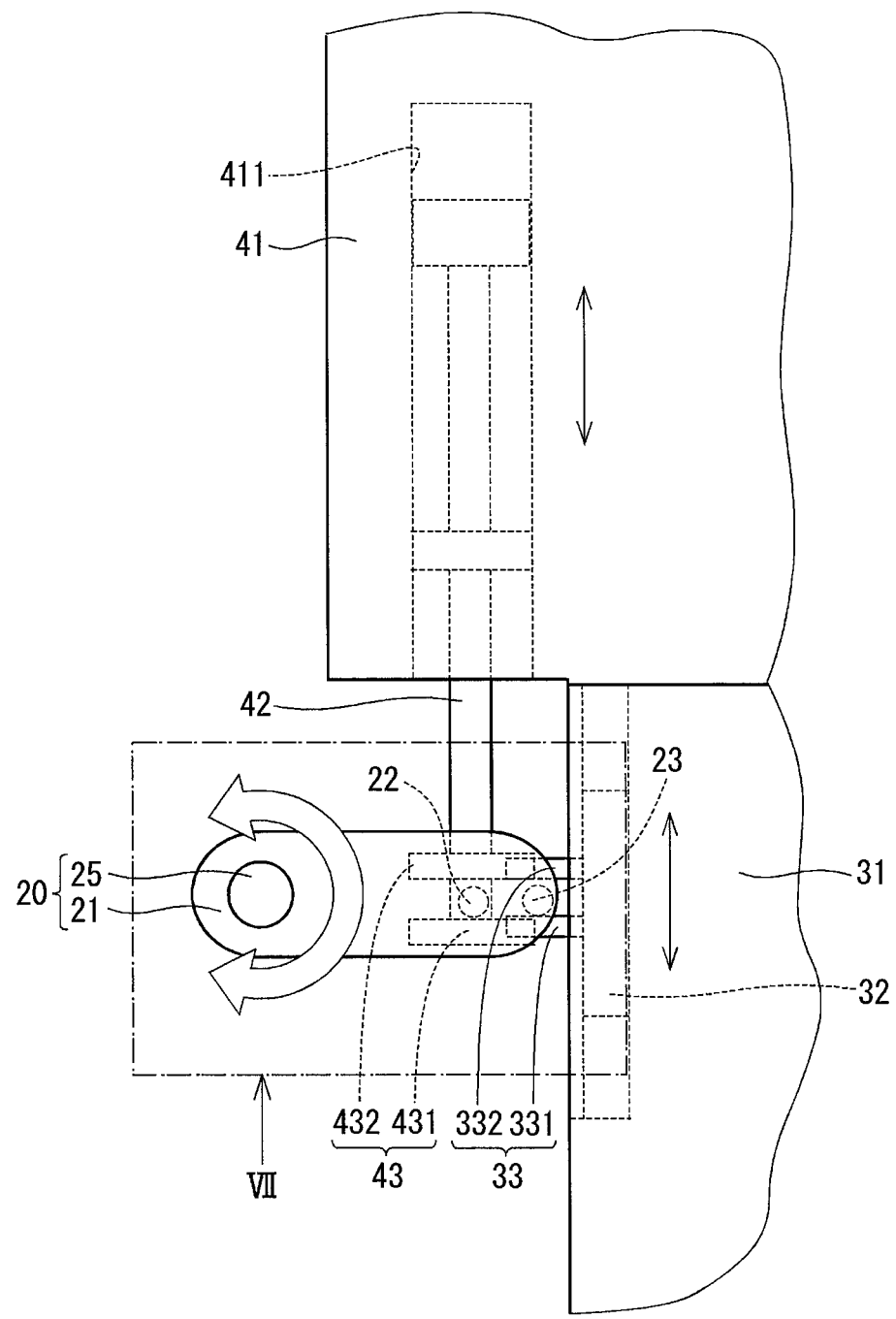
FIG. 6 is a schematic enlarged view showing portions indicated by an arrow VI in FIG. 2.
Figure 7A:
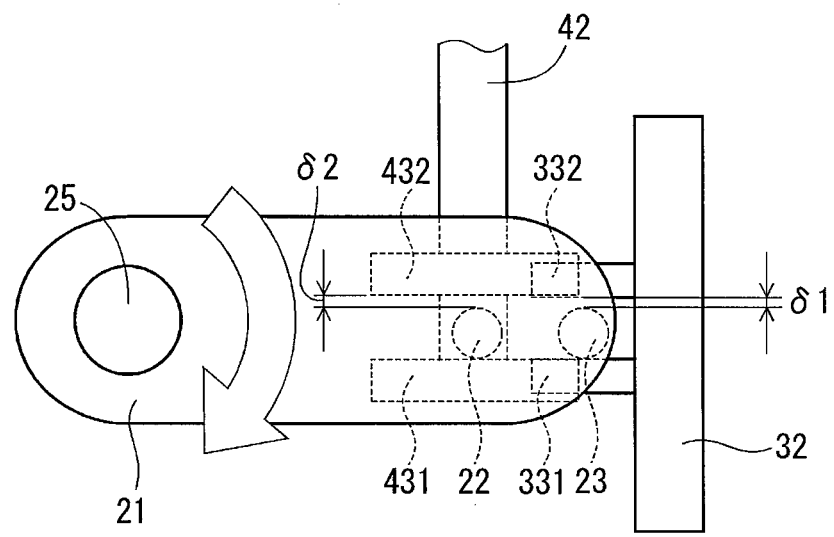
FIGS. 7A and 7B are schematic enlarged views, each showing a portion indicated by an arrow VII in FIG. 6.
Figure 7B:
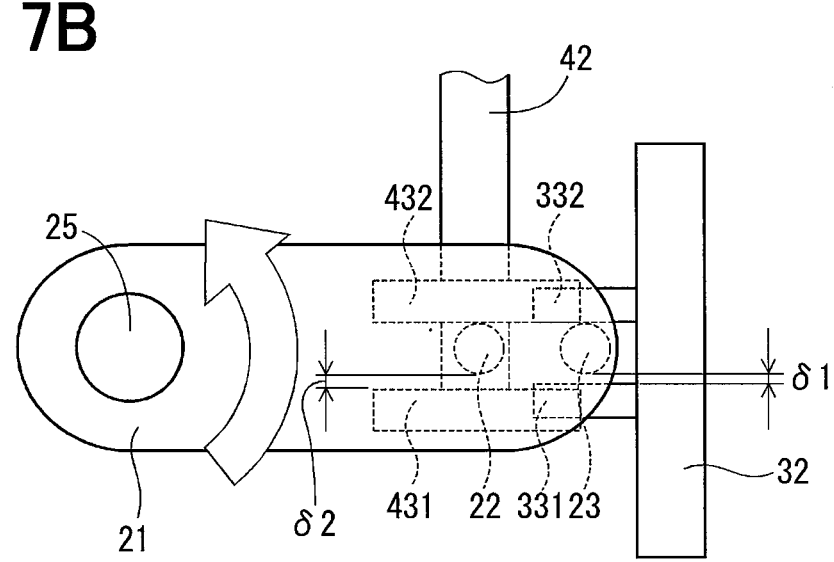

An error between the actual position of the spool 42 relative to the valve body 41 and the relative position of the spool 42 detected by the range sensor 30 will be explained with reference to FIGS. 6, 7A and 7B. FIG. 6 is a schematic enlarged view, when viewed in a direction of an arrow VI in FIG. 2, showing the detent lever 20, the spool 42 and the slider 32, which are coupled to each other. FIGS. 7A and 7B are enlarged views, each showing a portion of FIG. 6 (indicated by a one-dot-chain line VII in FIG. 6), wherein the first and second coupling pins 22 and 23 of the coupling plate 21 are respectively coupled with the coupling portions 43 and 33 when the detent lever 20 (that is, the coupling plate 21 and the lever 25) is rotated in a clockwise direction (FIG. 7A) and in an anti-clockwise direction (FIG. 7B). In FIGS. 6, 7A and 7B, arrows of curved lines indicate rotational directions of the lever 25. In FIG. 6, arrows of straight lines respectively indicate reciprocating directions of the slider 32 and the spool 42.

When the coupling plate 21, the slider 32 and the spool 42 are in their respective positions shown in FIG. 7A, in other words, when the lever 25 is rotated in the clockwise direction, the second coupling pin 23 is brought into contact with an inner wall of the first projection 331 of the coupling portion 33. As a result, a gap "δ1" is formed between the second coupling pin 23 and an inner wall of the second projection 332 of the coupling portion 33. The first coupling pin 22 is brought into contact with an inner wall of the first land 431 of the coupling portion 43, while a gap "δ2" is formed between the first coupling pin 22 and an inner wall of the second land 432 of the coupling portion 43.

When the lever 25 is rotated in the anti-clockwise direction from the position of FIG. 7A, both of the first and second coupling pins 22 and 23 are not brought into contact with the second land 432 of the coupling portion 43 and the second projection 332 of the coupling portion 33, if the lever 25 is rotated only by the gap "δ1" or "δ2" (whichever is smaller than the other). Therefore, the slider 32 and the spool 42 are not moved in this situation. The error in this situation between the actual relative position of the spool 42 to the valve body 41 and the relative position of the spool 42 detected by the range sensor 30 becomes an absolute figure of "δ1-δ2". For example, in a case that the gap "δ2" is larger than the gap "δ1" (as shown in FIG. 7A), the error of the relative position of the spool 42 becomes "δ2−δ1".

On the other hand, when the coupling plate 21, the slider 32 and the spool 42 are in their respective positions shown in FIG. 7B, in other words, when the lever 25 is rotated in the anti-clockwise direction, the second coupling pin 23 is brought into contact with an inner wall of the second projection 332 of the coupling portion 33. As a result, a gap "δ1" is formed between the second coupling pin 23 and the inner wall of the first projection 331 of the coupling portion 33. The first coupling pin 22 is brought into contact with an inner wall of the second land 432 of the coupling portion 43, while a gap "δ2" is formed between the coupling pin 22 and the inner wall of the first land 431 of the coupling portion 43.

In a similar manner, when the lever 25 is rotated in the clockwise direction from the position of FIG. 7B, both of the first and second coupling pins 22 and 23 are not brought into contact with the first land 431 of the coupling portion 43 and the first projection 331 of the coupling portion 33, if the lever 25 is rotated only by the gap "δ1" or "δ2" (whichever is smaller than the other). Therefore, the slider 32 and the spool 42 are not moved in this situation. The error in this situation between the actual relative position of the spool 42 to the valve body 41 and the relative position of the spool 42 detected by the range sensor 30 becomes an absolute figure of "δ1-δ2". For example, in the case that the gap "δ2" is larger than the gap "δ1" (as shown in FIG. 7B), the error of the relative position of the spool 42 becomes "δ2-δ1".

As above, in the oil-pressure control device 1 of the present embodiment, the error for the relative position of the spool 42, in the case that the lever 25 is rotated, between the actual relative position of the spool 42 and the relative position of the spool 42 detected by the range sensor 30 becomes the absolute figure of "δ1-δ2".

In the oil-pressure control device for the automatic transmission apparatus according to the prior art, the detent lever is supported by the transmission casing, while the slider and the spool are supported by the valve body of the manual valve. According to the method for manufacturing the oil-pressure control device of the prior art, the valve body is assembled to the transmission casing or the sensor body, and then the detent lever assembled to the transmission casing is coupled with the slider and the spool. However, when the slider and the spool (which are assembled to the valve body) are assembled to the detent lever (which is assembled to the transmission casing), it is necessary to assemble the movable slider and the movable spool to the detent lever at the same time and to position them relative to the detent lever. Therefore, a special jig is necessary for positioning the movable slider and the movable spool. In addition, a number of assembling steps is increased.

According to the present embodiment, the detent lever 20 (which is assembled at first to the transmission casing 11) and the slider 32 (which is assembled in the inside of the transmission casing 11 via the sensor body 31) are assembled to each other. In other words, the detent lever 20 and the slider 32 are assembled together, wherein the transmission casing 11 is used as a base (or a reference) for the assembling process. And then, the spool 42 of the valve body 41 (which is assembled to the sensor body 31) and the detent lever 20 are assembled to each other. In other words, the detent lever 20 and the spool 42 are assembled together, wherein the transmission casing 11 is used as the base for the assembling process.

According to the above assembling processes, it is not necessary to relatively position the movable slider 32 and the movable spool 42 to each other, while the error between the actual position of the spool 42 (the actual displaced position) and the position of the spool 42 detected by the range sensor 30 (the detected displaced position) can be maintained at the absolute figure of "δ1-δ2". Each of the slider 32 and the spool 42 can be independently and simply assembled to the detent lever 20. Therefore, it is possible to reduce the number of assembling steps for the oil-pressure control device 1 for the automatic transmission apparatus.

In the oil-pressure control device 1 of the present embodiment, the rotation sensors 34 are provided in the sensor body 31 of the range sensor 30 for detecting the rotational speed of the gears 19. The gears 19 are assembled to the transmission casing 11, wherein the transmission casing 11 is used as the base for the assembling process. Since the rotation sensor 34 are fixed to the transmission casing 11, which is also used as the base for the rotation sensors 34, it is possible to reduce an error of a relative position between the gears 19 and the rotation sensors 34, when compared with the oil-pressure control device of the prior art in which the rotation sensors are provided on the valve body. Accordingly, it is possible to increase detection accuracy for the rotational speed of the gears.

In the oil-pressure control device of the present embodiment, the connector 38 is formed in the sensor body 31. As a result, the connector 38 is fixed to the transmission casing 11, which is used as the base for the assembling process. It is, therefore, possible to reduce an error of a relative position between the connector 38 and the transmission casing 11, when compared with the oil-pressure control device of the prior art in which the connector is provided on the valve body. It is thereby possible to reduce a number of parts and components for reducing the error of the relative position between the connector 38 and the transmission casing 11.

In the oil-pressure control device of the present embodiment, the ECU 36 is provided in the sensor body 31. The rotation sensors 34 are provided in the sensor body 31 and the connector 38 is formed in the sensor body 31. According to such a structure, it is possible to reduce an amount of a wire harness for electrically connecting the ECU 36, the rotation sensors 34 and the connector 38 with one another.

Second Embodiment

An oil-pressure control device for an automatic transmission apparatus according to a second embodiment will be explained with reference to FIGS. 8 and 9. The second embodiment differs from the first embodiment in the shape of the positioning pins.

Figure 8:
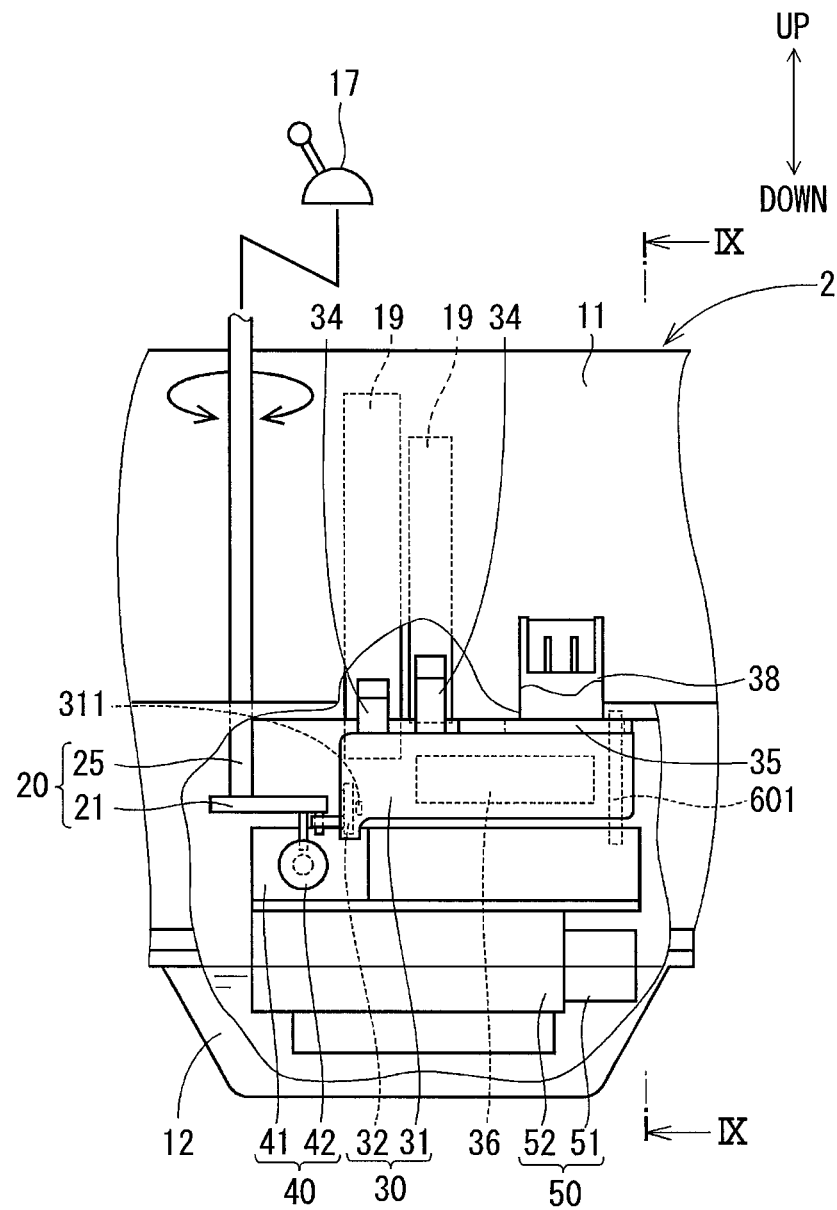
FIG. 8 is a schematic partial cross sectional view of an oil-pressure control device for the automatic transmission apparatus according to a second embodiment.
Figure 9:
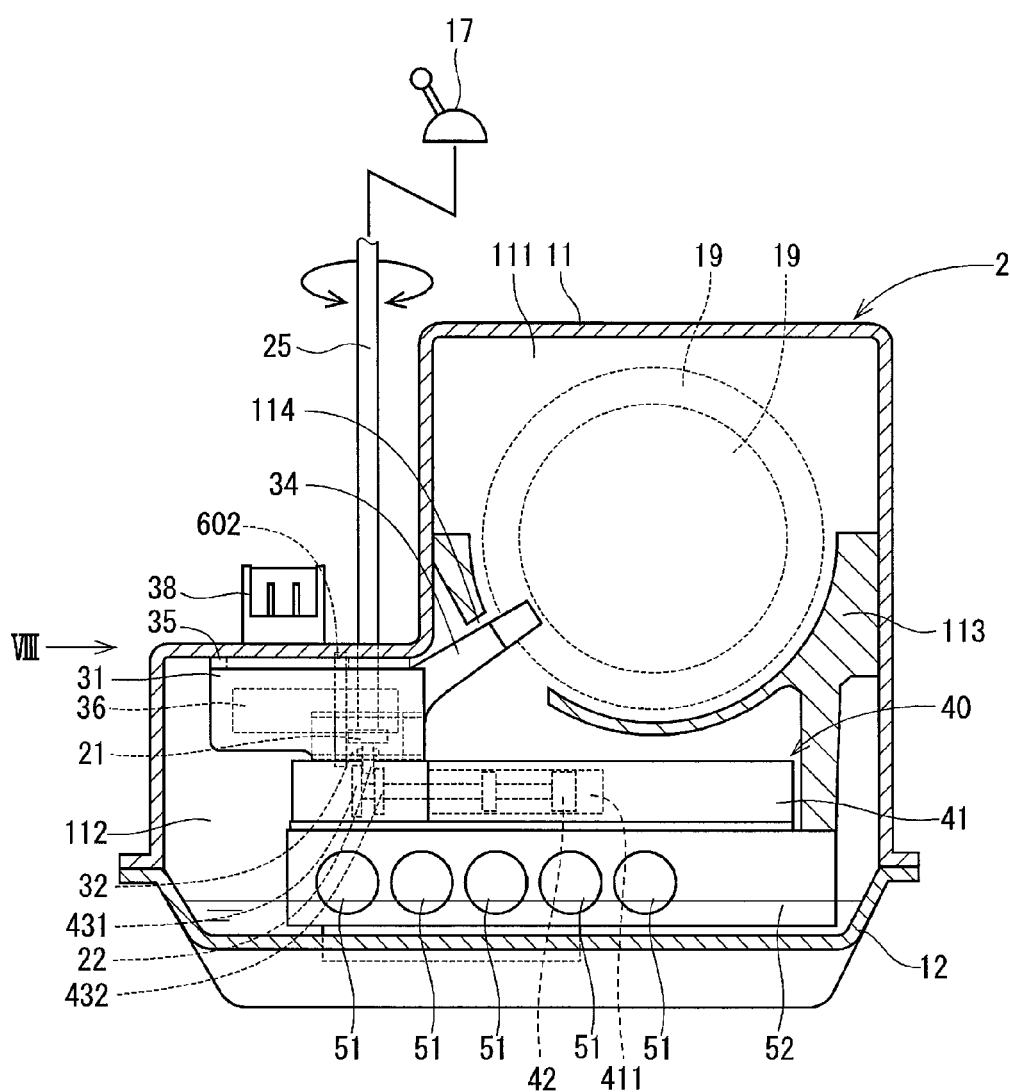
FIG. 9 is a schematic cross sectional view taken along a line IX-IX in FIG. 8.

FIG. 8 is a partial cross sectional view of an oil-pressure control device 2 for the automatic transmission apparatus, when viewed in a direction of an arrow VIII in FIG. 9.

In the oil-pressure control device 2 of the second embodiment, each of positioning pins 601 and 602 passes through the sensor body 31. More in detail, the positioning pins 601 and 602 position the sensor body 31 to the transmission casing 11, so that the sensor body 31 is fixed in the inside of the transmission casing 11, on one hand. On the other hand, the positioning pins 601 and 602 position and fix the valve body 41 to the sensor body 31. The positioning pins 601 and 602 are separated from each other in order to prevent the sensor body 31 and the valve body 41 from rotating with respect to the transmission casing 11.

In the oil-pressure control device 2 of the second embodiment, two positioning pins 601 and 602 are used for positioning the sensor body 31 and the valve body 41 to the transmission casing 11. It is, therefore, possible to increase positioning accuracy for the sensor body 31 and the valve body 41 to the transmission casing 11.

Further Embodiments and/or Modifications (1) In the above embodiments, the lever of the detent lever is rotated so as to transmit the shift range selected by the vehicle driver to the slider and the spool. The movement of the detent lever should not be limited to the rotational movement. The detent lever may be straightly moved in a reciprocal manner.

(2) In the above embodiments, the oil-pressure control device is applied to the vehicle of the FF type. The present disclosure may be applied to other types of vehicle than the FF type.

The present disclosure should not be limited to the above embodiments and/or modifications, but may be modified in various manners without departing from the spirits of the present disclosure.

What is claimed is:

1. An oil-pressure control device for controlling pressure of working oil to be supplied to an automatic transmission apparatus, which has multiple friction elements for carrying out an automatic transmission operation by engagement or dis-engagement of the friction elements when receiving the working oil, comprising:
    a housing;
    a coupling unit, one end of which is connected to a range selecting unit for selecting one of shift ranges, and the other end of which is inserted into the housing for transmitting the shift range selected by the range selecting unit by a rotational or a straight movement;
    a position detecting unit accommodated in the housing and connected to the other end of the coupling unit, the position detecting unit having a slider moving in tandem with the coupling unit, the position detecting unit further having a sensor body fixed to an inner wall of the housing for movably accommodating the slider so that the slider moves in a reciprocating manner, and the position detecting unit detecting a relative position of the slider to the sensor body;
    an oil-passage changing unit accommodated in the housing and connected to the other end of the coupling unit, the oil-passage changing unit having a spool moving in tandem with the coupling unit, the oil-passage changing unit further having a valve body fixed to the sensor body for movably accommodating the spool so that the spool moves in a reciprocating manner in the valve body, and the oil-passage changing unit changing oil-passage through which the working oil flows in accordance with a relative position of the spool to the valve body;
    a first positioning unit for positioning the sensor body to the housing; and
    a second positioning unit for positioning the valve body to the sensor body.

2. The oil-pressure control device according to claim 1, wherein
    the first positioning unit and the second positioning unit are integrally formed with each other.

3. The oil-pressure control device according to claim 1, wherein
    the sensor body has a rotational speed detecting unit for detecting rotational speed of a rotating member of the automatic transmission apparatus.

4. The oil-pressure control device according to claim 1, wherein
    the sensor body has a connector adapted to be connected to an electric device located outside of the oil-pressure control device.

5. The oil-pressure control device according to claim 1, wherein
    the sensor body has an electronic control unit for controlling the automatic transmission operation of the automatic transmission apparatus.

6. The oil-pressure control device according to claim 5, further comprising;
    a heat radiating unit for transmitting heat generated at the electronic control unit to the housing.

7. A method for manufacturing the oil-pressure control device according to claim 1, comprising;
    a first step for positioning the sensor body to the housing by the first positioning unit, when the sensor body accommodating the slider is assembled to the inner wall of the housing, so that the other end of the coupling unit and the slider are coupled to each other; and
    a second step for positioning the valve body to the sensor body by the second positioning unit, when the valve body accommodating the spool is assembled to the sensor body fixed to the housing, so that the other end of the coupling unit and the spool are coupled to each other.

* * * * *